Oct. 21, 1930.  J. L. RAY  1,779,076
FLUID SEAL PACKING GLAND
Filed March 30, 1927
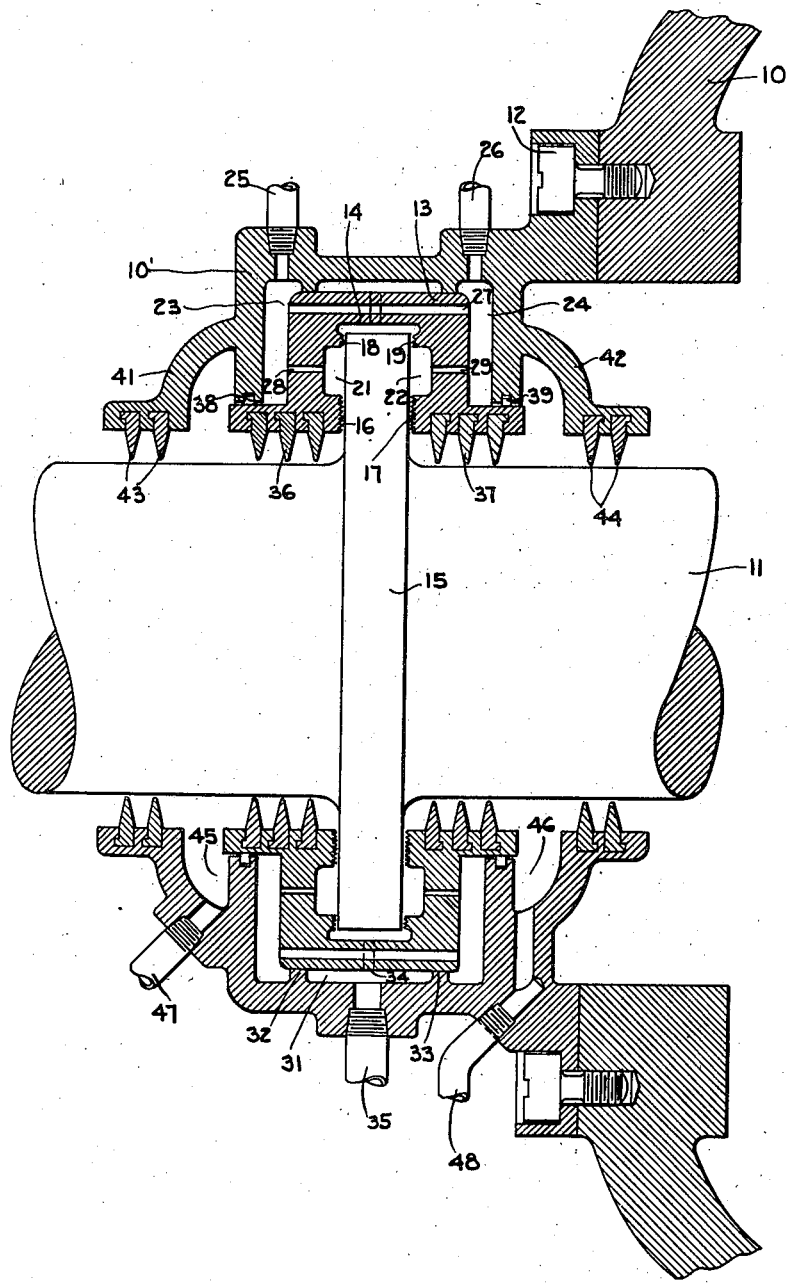
WITNESS
E. Lutz
INVENTOR
J. L. Ray
BY
A. B. Reavis
ATTORNEY Patented Oct. 21, 1930

1,779,076

UNITED STATES PATENT OFFICE

JAMES L. RAY, OF SWARTHMORE, PENNSYLVANIA, ASSIGNOR TO WESTINGHOUSE ELECTRIC & MANUFACTURING COMPANY, A CORPORATION OF PENNSYLVANIA

FLUID-SEAL PACKING GLAND

Application filed March 30, 1927. Serial No. 179,544.

My invention relates to packing for sealing the clearance between relatively rotating parts, and has for its object to provide a new and improved packing of the character designated.

More specifically, an object of my invention is to provide packing having close clearance permitting relative movement of the parts.

A machine subjected to considerable temperature changes, such as an elastic fluid turbine, is usually found to have a relative movement of the stationary and rotating parts due to unequal expansion caused by the temperature changes. In providing a packing, of the type which does not make actual contact between the relatively rotating parts, for the clearance between the stationary and rotating parts of such a machine, it has been necessary to provide a clearance slightly greater than the amount of relative movement caused by unequal expansion. Such a large clearance impairs the effectiveness of the packing.

In accordance with my invention, I provide one of the parts, preferably the stationary part, with a movable member which has a predetermined close clearance with the moving part. I also provide means for moving the movable member upon translatory movement of the rotating part, i.e., movement other than rotation about the axis of the rotating part to maintain the predetermined clearance. In this way it is possible to provide a clearance less than the relative movement caused by the unequal expansion.

Apparatus exemplifying my invention is illustrated in the accompanying drawing, in which:

The single figure is a sectional view through a packing between a machine casing and a shaft extending through the casing.

Referring to the drawing in detail, I show a machine casing 10, which may be a steam turbine casing, and a shaft 11 extending therethrough and adapted to rotate. An outer casing 10' forms a part of the machine casing 10, and is desirably made separate therefrom and attached thereto by screws 12, although it may be made integral therewith. Fitting within the outer casing 10' is an annular inner casing 13, which is axially movable therewith. The annular inner casing 13 is provided with an annular inwardly-opening groove 14. The shaft 11 carries a collar 15, which may be integral therewith or attached thereto and which is disposed in the groove 14 so as to occupy the larger portion thereof.

The groove 14 is provided with radial surfaces 16 and 17 near the inner periphery of the groove, and with radial surfaces 18 and 19, of less area, near the outer periphery thereof. These surfaces are disposed in close proximity to the sides of the collar 15, making close axial clearance therewith.

The groove 14 is also provided with an undercut recess 21 between the surfaces 16 and 18, and a similar recess 22 between the surfaces 17 and 19.

A space 23 on one side of the inner casing 13 and a space 24 on the other side of the casing communicate with a source of high pressure fluid, through the conduits 25 and 26, respectively. The pressure in the spaces 23 and 24 is equalized by passages 27 extending axially through the inner casing 13. Small metering holes or restricted orifices 28 and 29 in the inner casing 13 provide communication between space 23 and chamber 21, and between space 24 and chamber 22 respectively, permitting a restricted flow of fluid to the chambers 21 and 22. These orifices are small enough to restrict the flow of sealing fluid under pressure, that is, they restrict the flow of fluid to such extent that when there is a substantial escape of fluid from one of the chambers 21 and 22, the fluid cannot flow through the orifices rapidly enough to maintain the pressure in the chamber. A substantial clearance is provided between the outer periphery of the collar 15 and the outer periphery or bottom of groove 14, providing a space in which leakage of fluid by the clearances 18 and 19 may be collected. A recess 31 in the outer casing 10' between the shoulders 32 and 33 surrounds the inner casing 13 and communicates with the bottom of groove 14 through radial passages 34. The radial passages 34 are offset from and do not communicate with the axial passages 27. The recess 31 communicates with a discharge conduit 35.

The inner casing is further provided with labyrinth packing elements 36 outwardly of the groove 14 and the packing elements 37 inwardly thereof. The outer casing 10' is provided with packing elements 38 and 39 between the inner and outer casing for preventing the escape of high pressure fluid from the spaces 23 and 24. The outer casing is also provided with extensions 41 and 42 at the outer and inner ends thereof, respectively, and packing elements 43 and 44 are provided between these extensions and the shaft 11. The extensions 41 and 42 provide recesses 45 and 46, respectively, which collect any liquid which leaks by the packing elements 36 and 37. A discharge conduit 47 communicates with the bottom of recess 45 and the discharge conduit 48 communicates with the bottom of recess 46.

The operation of the above described construction is as follows:

High pressure fluid, preferably water, is admitted through conduits 25 and 26 to the spaces 23 and 24. A restricted flow of fluid to the chambers 21 and 22 is permitted through the small metering holes 28 and 29. The pressure in spaces 23 and 24 is equalized by the balance holes 27, so that the pressure delivered to the chambers 21 and 22 will be equal.

The shaft 15 normally rotates within the groove 14, having equal clearances with the sides of groove 14 on opposite sides thereof. There is a small leakage of fluid from the chamber 21 through the clearances 16 and 18, and a similar leakage from the chamber 22 through the clearances 17 and 19. The leakage through the clearances 18 and 19 is collected by the space in the bottom of groove 14 and discharged through passages 34 to the annular recess 31 from which it is discharged through conduit 35. The leakage of fluid through the clearances 16 and 17 is further retarded by the packing elements 36 and 37 respectively, as well as by centrifugal force due to impelling action of the rotating collar 15, and is then collected in recesses 45 and 46 and discharged through conduits 47 and 48 respectively.

The inner casing 13 is axially movable within the outer casing 10', having sliding contact therewith at the shoulders 32 and 33 and at the packing elements 38 and 39.

When the shaft 11 and collar 15 rotate in the same axial position the clearances on opposite sides of the collar 15 are substantially the same, and the pressures in chambers 21 and 22 are the same.

Assume now that the shaft 11 moves axially to the left. The clearances 16 and 18 are decreased. This prevents the escape of fluid from chamber 21 and increases the pressure therein due to the communication with the source of high pressure fluid through the metering holes 28. The clearances 17 and 19 are increased permitting a greater escape of fluid from chamber 22. This increased flow of fluid out of the chamber 22 lowers the pressure within said chamber. The pressure in chamber 21 now being greater than the pressure in chamber 22, the pressure in the first-mentioned chamber forces the inner casing axially to the left until the pressures in said chambers are again equal due to the clearances on opposite sides of the collar becoming the same and permitting equal discharge of fluid from the chambers 21 and 22.

Assume now that the shaft 11 and the collar 15 move axially to the right. The clearances 16 and 18 are now increased, permitting an increased flow of fluid out of chamber 21 and lowering the pressure therein. The clearances 17 and 19 are decreased, raising the pressure in chamber 22 due to the fluid flowing thereinto through holes 29 and being unable to escape therefrom as rapidly as it is flowing in. The pressure in chamber 22 now becomes greater than the pressure in chamber 21, and accordingly moves the inner casing 13 axially to the right until the axial clearances on opposite sides of collar 15 are again equalized as before.

From the above description, it will be seen that I have provided a packing wherein very close clearances may be provided, which clearances are maintained upon relative axial movement of the shaft 11 and the casing 10. It will be apparent that this closer clearance will greatly increase the effectiveness of the packing.

While I have shown my invention in one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The combination of a machine casing, a shaft rotatably disposed therein, an axially movable member carried by said casing and having an annular inwardly-opening groove therein, a collar carried by said shaft and disposed in said groove with close axial clearance, said movable member and said collar providing a chamber bounded by one radial side of the collar and the adjacent radial side wall of the groove and disposed intermediate said close axial clearance, means including a fixed orifice for providing a restricted flow of fluid under pressure into said chamber, and said close axial clearance permitting the restricted escape of fluid from said chamber in accordance with the amount of clearance.

2. The combination of a machine casing, a shaft rotatably disposed therein, an axially movable member carried by said casing and having an annular inwardly-opening groove therein, a collar carried by said shaft and disposed in said groove with close axial clearance, the side walls of said groove having undercut recesses forming chambers with the opposite sides of said collar, and means providing a restricted flow of fluid under pressure into each of said chambers.

3. The combination with a machine casing and a shaft extending therein and adapted to rotate, of an annular axially-movable inner casing carried by said machine casing and surrounding said shaft, an inwardly-opening annular groove being formed in said inner casing, a collar carried on said shaft and disposed in said groove, the side walls of said groove having undercut recesses on opposite sides thereof forming chambers with the adjacent sides of the collar, said collar and the walls of the groove having close axial clearance therebetween on opposite sides of the collar and groove and radially outwardly and inwardly of said chambers, the surfaces forming the inner clearances being greater in area than the surfaces forming the outer clearances, means for delivering a restricted quantity of fluid under equal pressure to said chambers, means for collecting and discharging the fluid escaping through said outer clearances, and packing means between said inner casing and said machine casing.

4. The combination with a machine casing and a shaft extending therein and adapted to rotate, of an annular axially-movable inner casing carried by said machine casing and surrounding said shaft, an inwardly-opening annular groove being formed in said inner casing, a collar carried on said shaft and disposed in said groove, the side walls of said groove having undercut recesses on opposite sides thereof forming chambers with the adjacent sides of the collar, said collar and the walls of the groove having close axial clearance therebetween on opposite sides of the collar and groove and radially outwardly and inwardly of said chambers, means for delivering a restricted quantity of liquid under pressure to said chambers, and means for collecting and discharging the liquid escaping through said outer clearances.

5. The combination of a machine casing, a shaft rotatably disposed therein, an axially movable member carried by said casing and having an annular inwardly-opening groove therein, a collar carried by said shaft and disposed in said groove with close axial clearance between the collar and the side walls of the groove, said movable member and said collar providing a chamber on each side of the collar and groove, each chamber being bounded by one radial side of the collar and the adjacent radial side wall of the groove and being disposed intermediate said close axial clearance, the axial movable member being formed with restricted orifices extending therethrough and communicating with the chambers, and means for admitting fluid under pressure to the chambers through said orifices, the close axial clearance on each side permitting a restricted escape of fluid from the adjacent chamber and controlling said escape and the pressure in the chamber in accordance with the amount of clearance.

6. The combination with a machine casing and a rotatable shaft extending therein, of an annular axially-movable member carried by said casing and surrounding said shaft, an inwardly-opening annular groove being formed in said member, a collar carried on said shaft and disposed in said groove, a chamber between each side wall of the groove and the adjacent side wall of the collar being formed by said side walls, said side walls having close axial clearance therebetween on opposite sides of the collar and groove and radially outwardly and inwardly of said chambers, means for admitting a restricted flow of liquid under pressure into each of said chambers, the close axial clearance on each side permitting a restricted escape of liquid from the adjacent chamber and controlling said escape and the pressure in the chamber in accordance with the amount of clearance.

7. The combination of a machine casing, a rotatable shaft extending therein, a collar carried by said shaft, an axially movable member carried by said casing and disposed adjacent said collar with close axial clearance between adjacent side walls of the collar and the member, a chamber being formed between said side walls by an annular recess in one of said side walls, means including a fixed orifice for providing a restricted flow of fluid under pressure into said chamber, said close axial clearance permitting a restricted escape of fluid from said chamber and controlling said escape and the pressure in the chamber in accordance with the amount of clearance, the fluid pressure in said chamber effecting movement of said movable member axially away from the collar upon decrease below a predetermined minimum clearance.

In testimony whereof, I have hereunto subscribed my name this 18th day of March, 1927.

JAMES L. RAY.